United States Patent Office 2,727,830
Patented Dec. 20, 1955

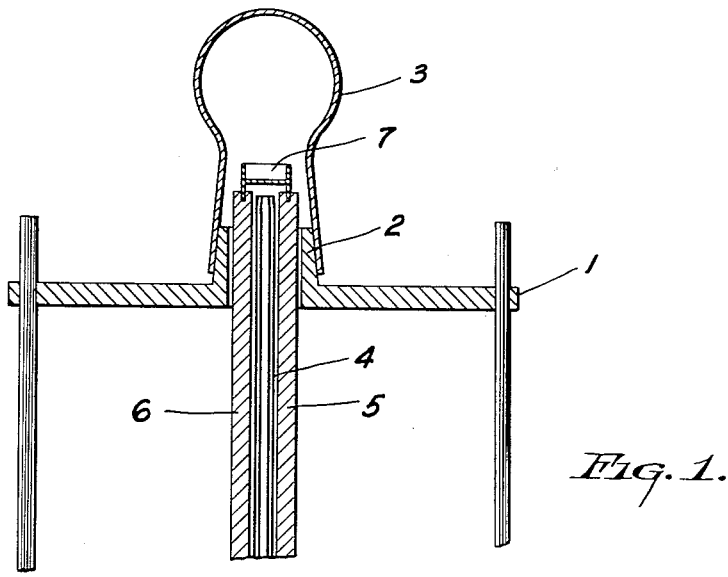
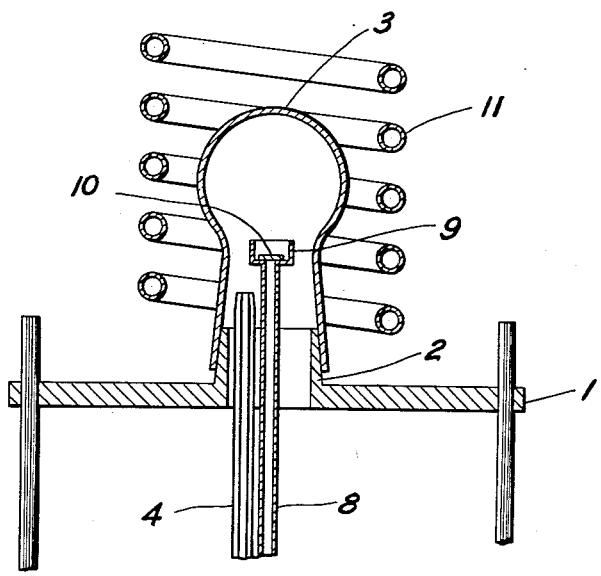

2,727,830

METHOD OF APPLYING LIGHT-DIFFUSING LAYER TO A GLASS SURFACE

Gerardus Hendricus Janssen and Petrus Cornelis van der Linden, Eindhoven, Netherlands, assignors to Hartford National Bank and Trust Company, Hartford, Conn., as trustee Application July 8, 1954, Serial No. 442,136

Claims priority, application Netherlands July 9, 1953

5 Claims. (Cl. 117—54)

The invention relates to a method of applying light-diffusing layers to a glass surface, for example, to the inner wall of the bulb of an electric incandescent lamp, in order to prevent the filament body from shining through the bulb in a troublesome manner.

For this purpose use was formerly made of bulbs made of opalescent glass, the price of which, however, is an obstacle to obtain a cheap mass product. Otherwise glass surfaces have been made light-diffusing by light absorption. However, etched bulbs have a limitation in that the filament body is not completely prevented from shining through the bulb.

According to a further prior suggestion the desired light diffusion was obtained by burning metals, for example magnesium, aluminum and silicon, the oxide of which has not only a strong light diffusing effect but also a permissible light absorption, in the interior of the bulb and by causing the smoke produced to settle on the bulb wall. However, the adhesion of these oxide layers to the glass surface proved to be insufficient for practical purposes.

By a method frequently carried out nowadays satisfactory layers of silicon dioxide are obtained by burning an organic silicon compound instead of silicon inside the bulb. Compared with the layers obtained by burning metals, these layers, which adhere satisfactorily to the bulb wall, cannot be conserved satisfactorily in air, so that it is necessary to work up soon bulbs provided with such layers into incandescent lamps.

It has furthermore been suggested to improve the adhesion of light-diffusing layers obtained by burning magnesium by treating the glass surface with gaseous hydrochloric acid prior to, during or after the burning operation. This method is less attractive in view of the difficult handling of gaseous hydrochloric acid and the intense corrosive action of this gas.

The invention has for its object to provide in a less troublesome manner an improvement in the adhesion of the magnesium oxide layers obtained by burning the metal, which are particularly suitable for the manufacture of incandescent lamps in view of their excellent light-diffusing effect, the use of substances which might adversely affect the life of the incandescent lamp being also avoided.

According to the invention a satisfactorily adhesive light-diffusing magnesium oxide layer is obtained by exposing the glass surface to gaseous oxidation products of phosphorus during or prior to the deposition of magnesium oxide.

The treatment with the gaseous oxidation products is preferably carried out simultaneously with the application of the magnesium oxide by burning of the metal since the temperatures then prevailing are sufficient to ensure the desired reaction of the oxidation products with the glass surface.

As an alternative the glass surface may be treated with the oxidation products by previously burning phosphorus in a bulb. In this case, however, it is sometimes necessary for the glass to be heated to a temperautre exceeding 150° during, or for some time after, this treatment in order to obtain the desired action upon the glass surface.

In a preferred method according to the invention magnesium and substances yielding oxidation products of phosphorus upon combustion are burned together and brought into contact with the glass surface.

Apart from a treatment with the gaseous or vaporous oxides of phosphorus themselves use may be made also of the combustion of phosphorus or of compounds thereof, for example phosphorus hydrides or phosphorus sulphides.

Apart from with a view to the risk of spattering upon combustion, the quantity of oxidation products of phosphorus is not limited to a maximum. Small quantities are already sufficient to obtain the desired adhesion. For example, in the case of the bulb of an incandescent lamp of 60 mm. in diameter having a surface of about 100 cm.$^2$ it is sufficient to burn 15 mgs. of red or white phosphorus. If phosphorus compounds for example $P_2O_3$, $P_2O_5$ or $PH_3$ are used, it is necessary to have at least a quantity yielding a corresponding quantity of oxidation products.

Not only by burning magnesium, but also by burning alloys of magnesium with other metals, for example lithium, aluminum, silicon, copper, zinc, tin, cobalt, nickel or antimony, the magnesium oxide may be applied to the glass surface by vaporisation. However, a sufficient combustibility generally requires an alloy containing in addition to magnesium not more than about 10% by weight of other constituents. Use may, for example, be made of the following alloys: 90Mg–10Al, 95Mg–5Si, 95Mg–5Zn, 90Mg–5Al–5Si, 95Mg–5Ca, 80Mg–10Al–10Cu.

The quantity of magnesium required for obtaining optimum light diffusion with minimum light absorption varies slightly with the distance of the surface to be coated during the combustion of the magnesium. If the combustion is effected in a glass bulb of 60 mm. in diameter, about 300 mgs. of magnesium are required to obtain a layer through which the filament of an incandescent lamp does not shine. In this case the light absorption is about 20%.

In accordance with the invention use is preferably made of glass surfaces previously rendered light diffusing by etching. Thus the fact that owing to the etching an appreciable light diffusion is already obtained substantially without increase in light absorption is utilised with advantage. By the combination with a comparatively thin magnesium oxide layer according to the invention, which consequently absorbs only a small quantity of light, a light diffusion is obtained at very slight light absorption in which the filament of an incandescent lamp does no longer shine through. It has thus proved to be even possible to reduce the total light absorption to 6 to 7% by burning 150 mgs. of magnesium in a bulb of 60 mms. in diameter.

The magnesium or the magnesium alloy and, as the case may be, the substances producing oxidation products of phosphorus by combustion may be burned in a container made of quartz, tungsten, tantalum, ferro-chromium or similar refractory materials. When carrying out the method the container is introduced into the bulb of the incandescent lamp and the combustion may be initiated by heating, preferably by electric ignition, for example of a filament or a carbon arc, by high frequency heating or, if use is made of a metal container, by passing current.

With a view to the adhesion and the light diffusion the method described above permits of obtaining layers which are at least equivalent to layers obtained by the combustion of organic silicon compounds and which exhibit sometimes even a slightly lower light absorption. Moreover, the layers according to the invention can be better conserved in air.

The improvement in the adhesion of the layer obtained by carrying out the method according to the invention appears to be connected with the formation of phosphates of alkaline and alkaline earth metals which are constituents of the glass. It has been found, for example, that by carrying out the method according to the invention a quartz surface, which consequently does not contain alkaline constituents, when provided with a magnesium oxide layer in the manner described above, does not exhibit an improvement in the adhesion.

The invention will now be described with reference to the accompanying drawing, which shows sectional views of two embodiments of devices which may be used in carrying out the method according to the invention.

Referring to Fig. 1, a stand plate 1 is provided with a projecting holder 2 which fits in a bulb 3 for an incandescent lamp. Through an aperture provided in the holder 2 a tube 4 for the supply of oxygen and/or air required for the combustion of magnesium and phosphorus is led in. This tube may, as an alternative, be used for the supply of gases capable of yielding oxidation products of phosphorus. A container 7 made of tungsten is mounted on two insulated current supplies 5 and 6. In this container, which may be heated by the passage of current, the magnesium and, as the case may be, the phosphorus may be ignited.

Fig. 2 shows a modification of the device, 1 again designates the stand plate, 2 the bulb holder, 3 the bulb and 4 the supply tube for the required gases. Through the aperture provided in the stand plate a holder 8 is taken in this case, on which the container 9 made in this case of quartz is mounted. A ferro-chromium plate 10 is arranged in this container. Finally 11 designates a coil for the ignition of the magnesium and the phosphorus in the container 9 by means of high frequency heating.

What is claimed is:

1. A method of applying a light-diffusing layer on a glass surface comprising the steps, exposing the glass surface to the action of gaseous oxidation products obtained by combustion of a material selected from the group consisting of phosphorous, phosphorous oxides and phosphorous hydride, and applying to the so-treated surface magnesium oxide obtained by combustion of a material selected from the group consisting of magnesium and alloys thereof.

2. A method as claimed in claim 1 in which the material yielding upon combustion magnesium oxide and the material producing upon combustion gaseous oxidation products of phosphorous are burned together and brought into contact with the glass surface.

3. A method as claimed in claim 1, in which phosphorous is burned to produce gaseous oxidation products of phosphorous which are brought into contact with the glass surface.

4. A method as claimed in claim 1, in which the glass surface is frosted previously by etching.

5. A method of applying a light-diffusing layer on a glass surface comprising the steps, exposing the glass surface to the action of gaseous oxidation products obtained by combustion of a material selected from the group consisting of phosphorous, phosphorous oxides and phosphorous hydride, heating the glass to a temperature of more than about 150° C., and applying to the so-treated surface magnesium oxide obtained by combustion of a material selected from the group consisting of magnesium and alloys thereof.

References Cited in the file of this patent

UNITED STATES PATENTS

| | | |
|---|---|---|
| 2,171,227 | Schreinemachers | Aug. 29, 1939 |
| 2,451,590 | Tidak et al. | Oct. 19, 1948 |